Feb. 6, 1968 J. D. SYMONS 3,367,666

SEAL

Filed Dec. 23, 1965

INVENTOR.
James D. Symons
BY
E. J. Biskup
ATTORNEY 3,367,666
SEAL
James D. Symons, Southfield, Mich., assignor to General
Motors Corporation, Detroit, Mich., a corporation of
Delaware
Filed Dec. 23, 1965, Ser. No. 516,036
11 Claims. (Cl. 277—40)

ABSTRACT OF THE DISCLOSURE

A lip-type seal wherein a metallic spring member comprising a plurality of slender columns, located in load transfer relationship with the seal member, urges the sealing lip into engagement with the surface to be sealed. Each of the columns is of a length such that it elastically deflects along its axis in assembly to exert a predetermined constant loading between the seal lip and the surface to be sealed.

---

In many conventional seals, a garter spring is commonly associated with the elastomeric sealing member for applying a load or exerting a pressure to hold the sealing surface of the member in sealing engagement with the surface to be sealed. If the pressure exerted is greater than initially required to compensate for future seal wear, the elastomeric material is forced into the surface to be sealed and rapid wear of the sealing member results. On the other hand, if the pressure exerted is initially correct for good sealing without rapid seal wear, the spring force is considerably reduced and at times is lost completely as the seal wears.

The present invention solves this problem by providing a seal having novel and unique spring means for applying a constant load to the sealing member. The spring means comprises a thin metal ring retained between the casing and the elastomeric sealing member and divided about its circumference into a number of interconnected slender columns. It is known that the force exerted by a slender column remains substantially constant over a wide range of column deflection. Thus, when a seal embodying a spring means of this type interferingly engages a surface to be sealed, the sealing member is deflected radially outward and the spring columns are caused to bow or deflect, but the spring load remains constant. As the elastomeric material of the sealing member wears during use, the column deflection decreases but the applied load remains the same.

One feature of this invention is that it provides a seal wherein the pressure exerted on the sealing member by the spring means remains substantially constant over the useful life of the seal.

Another feature of this invention is that the spring means includes a thin metal ring having a number of pressure exerting slender columns.

Yet another feature of this invention is that the pressure exerted on the sealing member by the slender columns remains constant over a range of column deflection greater than the maximum seal deflection.

A further feature of this invention is that it provides such a seal wherein the sealing member has great torsional rigidity due to the spring configuration.

The features of this invention will be made apparent in the following detailed description taken in conjunction with the accompanying drawings wherein.

Figure 1:
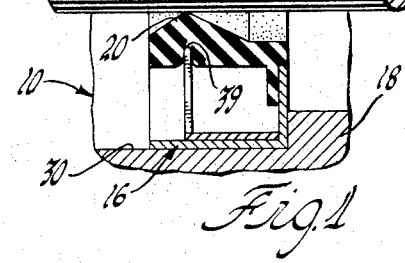
FIGURE 1 is a view, partially in section, of a seal installation embodying a seal made according to this invention.

Referring to FIGURE 1, a seal installation 10 includes a shaft 12 having an outer cylindrical surface 14 to be sealed and a seal 16 mounted on a housing 18. The seal 16 comprises an elastomeric sealing member 19 having a seal lip portion 20 with a sealing surface 22 in sealing engagement with the surface 14. It will be understood that the shaft 12 and the seal 16 are rotatable relative to each other about their common axis 24 while the fluid being sealed is located to one side of the seal 16 between the shaft 12 and the housing 18.

Figure 2:
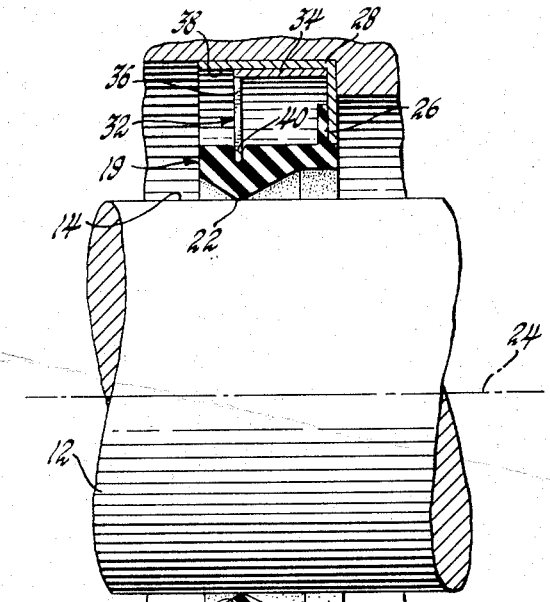
FIGURE 2 is a perspective view of a portion of the seal shown in FIGURE 1.
Figure 2:
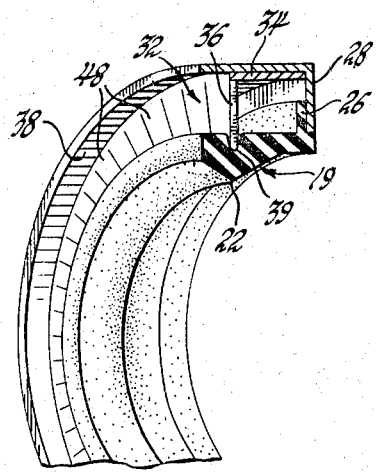
Figure 4:
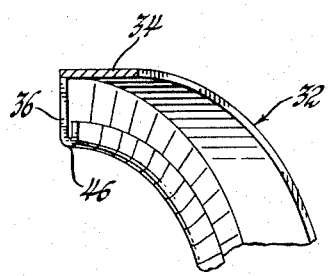
FIGURE 4 is a view similar to FIGURE 3 of another modified spring member.
Figure 3:
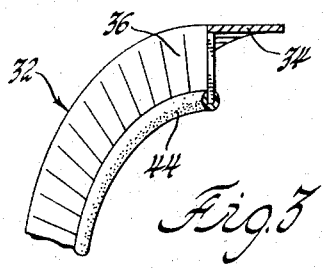
FIGURE 3 is a perspective view of a portion of a modified spring member.

The seal 16 includes a radially extending annulus portion 26 integrally formed with the lip portion 20 and rigidly bonded to an annular metallic casing 28 located within a shouldered bore 30 in housing 18. A spring member 32 encircles the sealing member 19 and serves to apply a radial load which urges the surface 22 of seal lip portion 20 into sealing engagement with the surface 14. The spring member 32 is formed from a ring of thin sheet metal and, as shown in FIGURES 1 and 2, is generally L-shaped in cross-section with mutually perpendicular annular branches or portions 34 and 36. Portion 34 conforms to the interior surface 38 of the casing 28 and is supported thereon while portion 36 extends radially inwardly from portion 34 and terminates with a free edge 39 that seats within an annular groove 40 formed in the sealing member 19. The free edge 39 of portion 36 is rounded to prevent high unit loadings on the sealing member at the groove 40. The same result can be obtained by using a round rubber bead 44 secured to the free edge as shown in FIGURE 3. Alternatively, the free edge, as shown in FIGURE 4, may have a return bend so as to form a round section 46 which can seat within the groove 40. It will be noted that except for the configuration of the free edge portion, the spring members shown in FIGURES 3 and 4 are identical in structure to the spring member 32 in FIGURES 1 and 2. Accordingly, the same numerals are utilized to identify corresponding parts of the spring members. Moreover, while the spring member 32 is depicted as L-shaped, it may be of various other shapes such as T-shaped or I-shaped.

Irrespective of how the spring 32 may be shaped, the important feature thereof is that the portion 36 is slit radially at a number of places about its circumference to form a plurality of interconnected slender columns 48. As seen in FIGURE 2 the slits are equally spaced and extend from the free edge 39 to the portion 34. The columns 48 are generally straight or perpendicular when the sealing member is not flexed, and are of a length so that they will elastically deflect axially or bow when the seal is assembled on the shaft and the sealing member is flexed. Thus, the spring 32 applies a predetermined load to the seal lip portion 20 to hold the sealing surface 22 in proper sealing engagement with the surface 14. Under prolonged use the seal lip portion 20 will, of course, wear and the columns 48 will gradually straighten or return to a more nearly perpendicular position. As this occurs, however, they will continue to apply a constant load to the seal lip portion since a characteristic of flexible slender columns is that the force applied thereby remains essentially constant over a considerable range of elastic column deflection. In the present case, the contemplated maximum amount of seal lip flexure is well within this range of column deflection. Thus, the spring force needed to urge the seal lip into sealing contact with the surface being sealed is not reduced or lost entirely as the sealing member wears.

Torsional rigidity of the seal lip portion 20 is another advantage which accrues by use of the spring member 32. Any circumferential rotation of the seal lip portion occurring in use causes the lip force to increase due to foreshortening of the seal lip elements. Since circumferential rotation is reduced due to the high torsional rigidity of the present assembly, a smaller, more flexible lip may be used with the column spring configuration of the present invention. In addition, since the spring member 32 is secured to the seal case, the seal lip is stabilized axially and gives improved operation when used in sealing applications involving reciprocating shafts.

Figure 5:
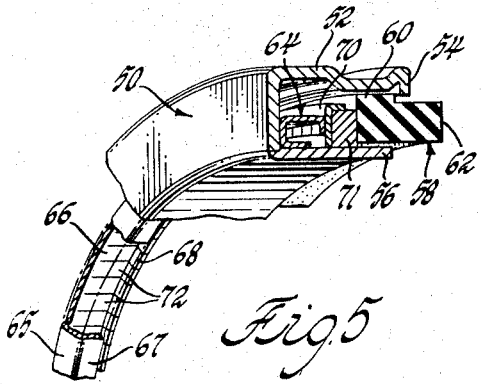
FIGURE 5 is a broken away perspective view of another embodiment of the invention.

FIGURE 5 discloses a face-type seal according to this invention. An annular generally U-shaped casing 50 has an outer rim 52 provided with an inwardly extending flange 54 at its outer edge, and an inner rim 56. Supported within the generally parallel rims 52, 56 is an annular resilient sealing member 58 which has a shouldered portion 60 engageable with the flange 54 to retain the sealing member within the casing 50. A sealing surface 62 is adapted to engage a surface to be sealed and is urged outwardly into sealing engagement by a spring member 64. The spring member 64 is formed from a thin metal ring and has mutually perpendicular annular portions or branches 65 and 66. The portion 65 seats against the inner surface of casing 50 and has an inwardly turned flange end 67 which abuts the inner rim 56 to locate the spring within the casing. The annular portion 66 has a flanged end portion 68 seating against an annular plate 70 which is separated from the sealing member 58 by a spacer 71. Portion 66 has a number of parallel slits about its circumference extending normally from the flanged end portion 68 to the portion 65 which divide the portion into a number of identical and interconnected slender columns 72.

In the seal seen in FIGURE 5, the spring load is transmitted to the sealing member 58 through the plate 70 and spacer 71. When the seal is assembled on a shaft, the spring 64 applies a predetermined load to the sealing annulus 58 to hold the sealing surface 62 in proper sealing engagement with the surface being sealed. As should be apparent, the columns 72 function as previously described in connection with the seal of FIGURES 1 and 2.

Figure 6:
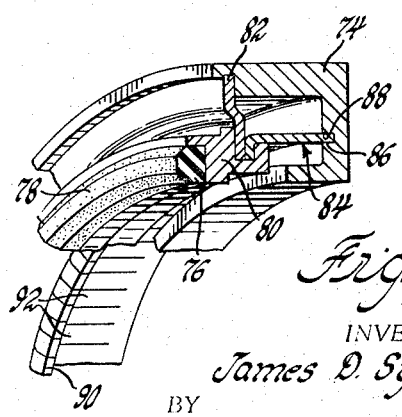
FIGURE 6 is a view similar to FIGURE 5 and showing a further embodiment.

FIGURE 6 is a modified face-type seal, similar to that of FIGURE 5, and includes a casing 74 and an annular resilient sealing member 76 having a sealing surface 78. The sealing member 76 is bonded to a body member 80 and the assembly is anchored to the casing by retainer 82 in a manner allowing the sealing member limited axial movement. The sealing member 76 is held in sealing engagement with a surface to be sealed by an annular spring member 84 which is formed from a thin metal ring and has one end portion 86 thereof received within a groove 88 in the inner surface of casing 74. The other end portion 90 is flanged and held within the member 80 adjacent the retainer 82. The spring member 84 has a plurality of parallel slits about its circumference extending axially from the end portion 90 to the end portion 86 and dividing the member into a number of identical and interconnected slender columns 92. The seal of FIGURE 6 operates in the same manner as the seal of FIGURE 5.

Various changes and modifications can be made in the above described structure without departing from the spirit of the invention. Such changes and modifications are contemplated by the inventor and he does not intend to be limited except by the scope of the claims which follow.

I claim:
1. A seal comprising, a pair of relatively movable members, one member having a surface to be sealed, the other member including a resilient sealing member mounted on said other member and having a sealing surface engageable with the surface to be sealed, and metallic spring means mounted on said other member and having a number of slender columns located in load transfer relationship with said sealing member to urge said sealing surface into engagement with said surface to be sealed, each of said columns being of a length to elastically deflect along its axis and exert a predetermined constant load upon said sealing member to hold said surfaces in sealing engagement.

2. The seal recited in claim 1 wherein said spring means includes a thin metal ring, said ring having a number of slits about its circumference to divide said ring into a plurality of slender columns.

3. A lip-type seal comprising, a resilient sealing member having a seal lip integral therewith engageable with the surface of a second member, and metallic spring means located circumjacent said sealing member and including a number of interconnected and elastically deflectable slender columns, each of said columns being of a length to elastically deflect along its axis and exert a predetermined constant load upon said seal lip to hold said seal lip in sealing engagement with said surface of said second member when positioned in load transfer relationship with said sealing member.

4. The seal recited in claim 3 wherein said spring means includes a thin metal ring located circumjacent said sealing member with an end surface thereof bearing upon said sealing member, said ring having a plurality of slits about its circumference dividing said ring into a number of interconnected slender columns.

5. The seal recited in claim 3 wherein said sealing member is secured to an annular casing and said spring means comprises an annular member of L-shaped cross-section, one branch of said annular member conforming to and supported upon an inner surface of said annular casing, the second branch of said annular member extending between said inner surface and said sealing member and having a free edge in engagement with a surface of said sealing member opposite said seal lip, said second branch being divided into a number of elastically deflectable slender columns.

6. The seal recited in claim 5 wherein the free edge of said second branch is rounded and received within a circumferential groove in said sealing annulus.

7. The seal recited in claim 5 wherein the free edge is provided with a rubber bead.

8. The seal recited in claim 5 wherein the free edge has a reverse bend and is J-shaped.

9. The seal recited in claim 5 wherein said second branch has a plurality of slits extending radially from said one branch through said free edge and dividing said second branch into a plurality of identical slender columns.

10. A face-type seal comprising, an annular casing, a resilient sealing member retained by said casing and having a sealing surface adapted to sealingly engage the surface of a second member, and metallic spring means located between said casing and said sealing member and including a number of interconnected and elastically deflectable slender columns, said columns being of a length such that each of said columns will elastically deflect along its axis and exert a predetermined constant load upon said sealing member to urge said sealing surface into sealing engagement with the surface of said second member when positioned in load transfer relationship with said sealing member.

11. The seal recited in claim 10 wherein said spring means includes a thin metal ring located between said casing and said sealing member with end surfaces thereof bearing upon surfaces of said casing and said sealing member, said ring having a plurality of slits about its circumference extending between the end surfaces thereof to divide said ring into a number of interconnected slender columns.

References Cited

UNITED STATES PATENTS

| | | | |
|---|---|---|---|
| 1,989,356 | 1/1935 | Greenidge | 277—152 X |
| 2,093,021 | 9/1937 | Olsen | 277—51 |
| 2,755,113 | 7/1956 | Baumheckel | 277—94 |
| 3,114,559 | 12/1963 | Miglietti et al. | 277—94 |
| 3,178,191 | 4/1965 | Dodd et al. | 277—138 |

FOREIGN PATENTS 562,125  6/1944  Great Britain.

SAMUEL ROTHBERG, *Primary Examiner.*